(12) United States Patent
Bales et al.

(10) Patent No.: US 10,808,541 B2
(45) Date of Patent: Oct. 20, 2020

(54) FAN BLADE FOR A GAS TURBINE ENGINE

(71) Applicant: United Technologies Corporation, Farmington, CT (US)

(72) Inventors: Daniel A. Bales, Avon, CT (US); Eric W. Malmborg, Amston, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 71 days.

(21) Appl. No.: 16/219,164

(22) Filed: Dec. 13, 2018

(65) Prior Publication Data
US 2020/0190985 A1 Jun. 18, 2020

(51) Int. Cl.
  *F01D 5/14* (2006.01)
  *B23K 101/00* (2006.01)
  *B23K 26/244* (2014.01)

(52) U.S. Cl.
  CPC ............ *F01D 5/147* (2013.01); *B23K 26/244* (2015.10); *B23K 2101/001* (2018.08); *F05D 2220/36* (2013.01); *F05D 2230/232* (2013.01); *F05D 2240/30* (2013.01); *F05D 2240/305* (2013.01); *F05D 2240/306* (2013.01)

(58) Field of Classification Search
  None
  See application file for complete search history.

(56) References Cited

U.S. PATENT DOCUMENTS

| | | | |
|---|---|---|---|
| 9,359,901 B2 | 6/2016 | Evans et al. | |
| 9,657,577 B2 | 5/2017 | Weisse | |
| 10,215,027 B2 * | 2/2019 | Schwarz | F01D 5/16 |
| 2005/0254955 A1 * | 11/2005 | Helder | F01D 5/147 |
| | | | 416/233 |
| 2008/0308610 A1 * | 12/2008 | Watson | B23K 33/004 |
| | | | 228/112.1 |
| 2011/0204122 A1 * | 8/2011 | Watson | B23K 20/122 |
| | | | 228/112.1 |
| 2013/0039774 A1 * | 2/2013 | Viens | F04D 29/388 |
| | | | 416/226 |
| 2015/0226068 A1 * | 8/2015 | Maurizio | F01D 5/147 |
| | | | 416/223 A |
| 2016/0177732 A1 * | 6/2016 | Whitehurst | F01D 5/28 |
| | | | 60/805 |

FOREIGN PATENT DOCUMENTS

| | | |
|---|---|---|
| EP | 1596036 | 11/2005 |
| EP | 2589461 | 5/2013 |
| EP | 3441573 | 2/2019 |

OTHER PUBLICATIONS

EP Search Report for EP Application No. 19215837.6 dated May 20, 2020.

* cited by examiner

*Primary Examiner* — Brian P Wolcott
*Assistant Examiner* — Jason G Davis
(74) *Attorney, Agent, or Firm* — Carlson, Gaskey & Olds, P.C.

(57) ABSTRACT

An airfoil includes an airfoil body portion that has a pressure side and a suction side. A recessed area in the airfoil body portion is located on one of the pressure side or the suction side. At least one rib divides the recessed area into at least one geometric shape. A cover encloses the recessed area and includes at least one pedestal that engages a distal end of at least one rib. A weld extends through the cover and a portion of at least one rib. The weld spans a width of the distal end of at least one rib.

17 Claims, 6 Drawing Sheets

FAN BLADE FOR A GAS TURBINE ENGINE

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Fan blades are used to direct air into the gas turbine engine. Typically, fan blades are made of metal, such as titanium or aluminum, and have an airfoil shape that includes a twist from the root of the blade to the tip of the blade. However, the fan blade is often not solid metal due to weight constraints. Rather, a hollow fan blade is used to achieve lighter weight. The process for producing a hollow titanium fan blade can be time-consuming, complex, and expensive, often requiring a costly protective environment and equipment.

SUMMARY

In one exemplary embodiment, an airfoil includes an airfoil body portion that has a pressure side and a suction side. A recessed area in the airfoil body portion is located on one of the pressure side or the suction side. At least one rib divides the recessed area into at least one geometric shape. A cover encloses the recessed area and includes at least one pedestal that engages a distal end of at least one rib. A weld extends through the cover and a portion of at least one rib. The weld spans a width of the distal end of at least one rib.

In a further embodiment of any of the above, the weld circumscribes the geometric shape and forms a continuous loop following the geometric shape.

In a further embodiment of any of the above, at least one pedestal includes a rib contact surface that has a width greater than a width of the distal end of at least one rib.

In a further embodiment of any of the above, at least one geometric shape is closed form.

In a further embodiment of any of the above, at least one geometric shape includes at least one of an elliptical shape or a circular shape.

In a further embodiment of any of the above, the weld includes an overlapping weld portion.

In a further embodiment of any of the above, an indentation defines a perimeter of the recessed area. A perimeter weld extends through the cover into a portion of the body portion and defines the indentation. The perimeter weld circumscribes the recessed area.

In a further embodiment of any of the above, the perimeter weld includes an overlapping weld portion.

In a further embodiment of any of the above, the indentation includes a perimeter ledge for engaging an inner surface of the cover and a perimeter wall for engaging an edge of the cover.

In a further embodiment of any of the above, a ratio of a radius of a pedestal fillet to a width of the pedestal between the weld and the fillet is between 0.3 and 5.0.

In a further embodiment of any of the above, at least one rib includes a distal end that has a width greater than a width of a mid-portion of at least one rib.

In another exemplary embodiment, a method of forming an airfoil includes the step of forming a recessed area into an airfoil body portion. The recessed area includes at least one rib that divides the recessed area into at least one geometric shape. A cover is located over the recessed area. The cover includes at least one pedestal that engages a distal end of at least one rib. The weld through the cover into a portion of at least one rib forms a weld. The weld spans a width of the distal end of at least one rib.

In a further embodiment of any of the above, the weld circumscribes the geometric shape and forms a continuous loop following the geometric shape.

In a further embodiment of any of the above, the pedestal includes a rib contact surface that has a width greater than a width of the distal end of at least one rib.

In a further embodiment of any of the above, the weld through the cover into a portion of at least one rib includes an overlapping weld portion.

In a further embodiment of any of the above, an indentation is formed in the airfoil body portion around a perimeter of the recessed area.

In a further embodiment of any of the above, a perimeter weld is welded through the cover into a portion of the airfoil body portion that defines the indentation. The perimeter weld circumscribes the indentation.

In a further embodiment of any of the above, the perimeter weld includes an overlapping weld portion.

In a further embodiment of any of the above, the indentation includes a perimeter ledge for engaging an inner surface of the cover and a perimeter wall for engaging an edge of the cover.

In a further embodiment of any of the above, an exterior surface of the airfoil including a portion of the weld is machined.

DETAILED DESCRIPTION

Figure 1:
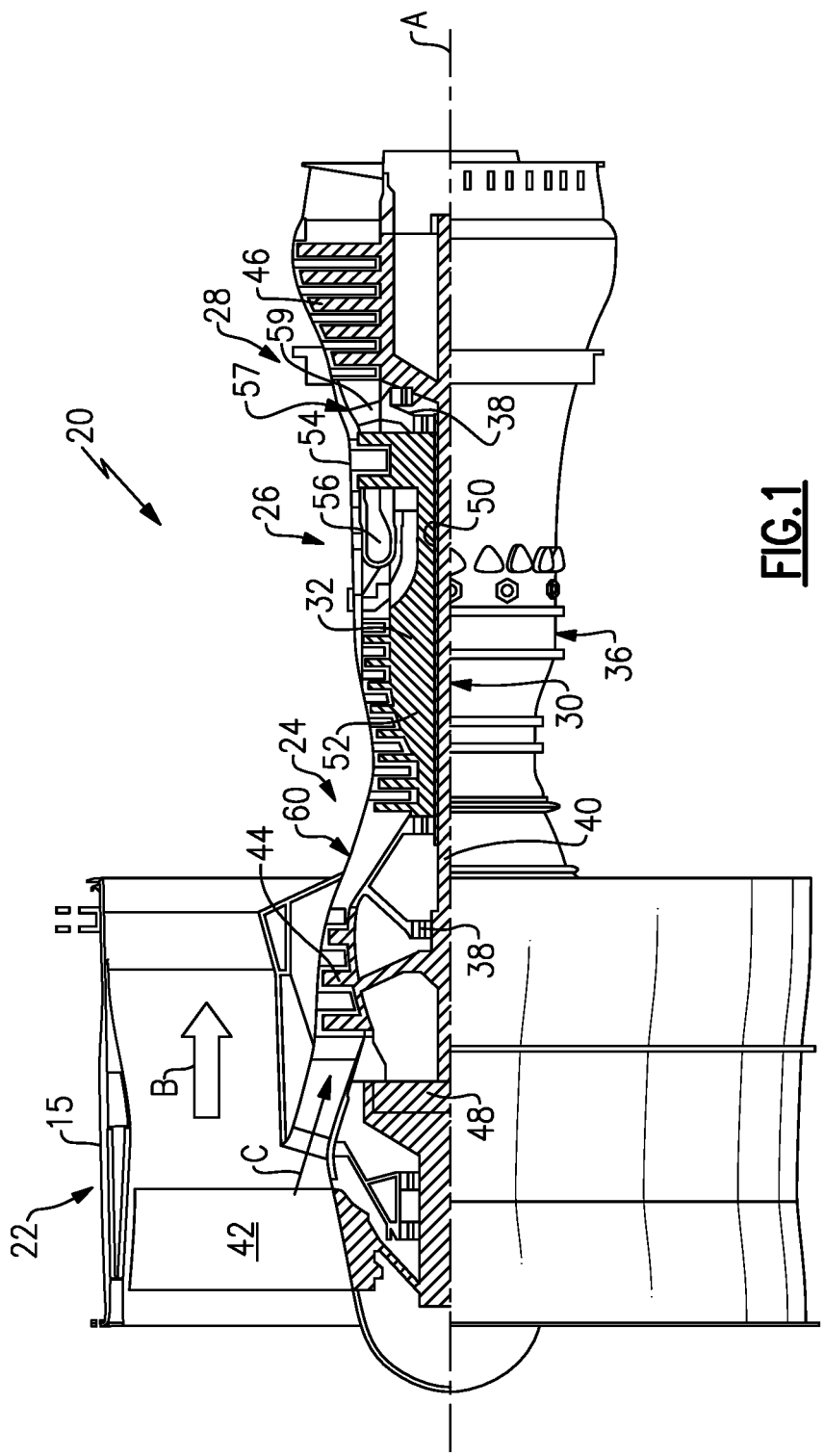
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15 or fan case, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7\ °R)]^{0.5}$. The "Low corrected fan tip speed" as disclosed herein according to one non-limiting embodiment is less than about 1150 ft/second (350.5 meters/second).

Figure 2:
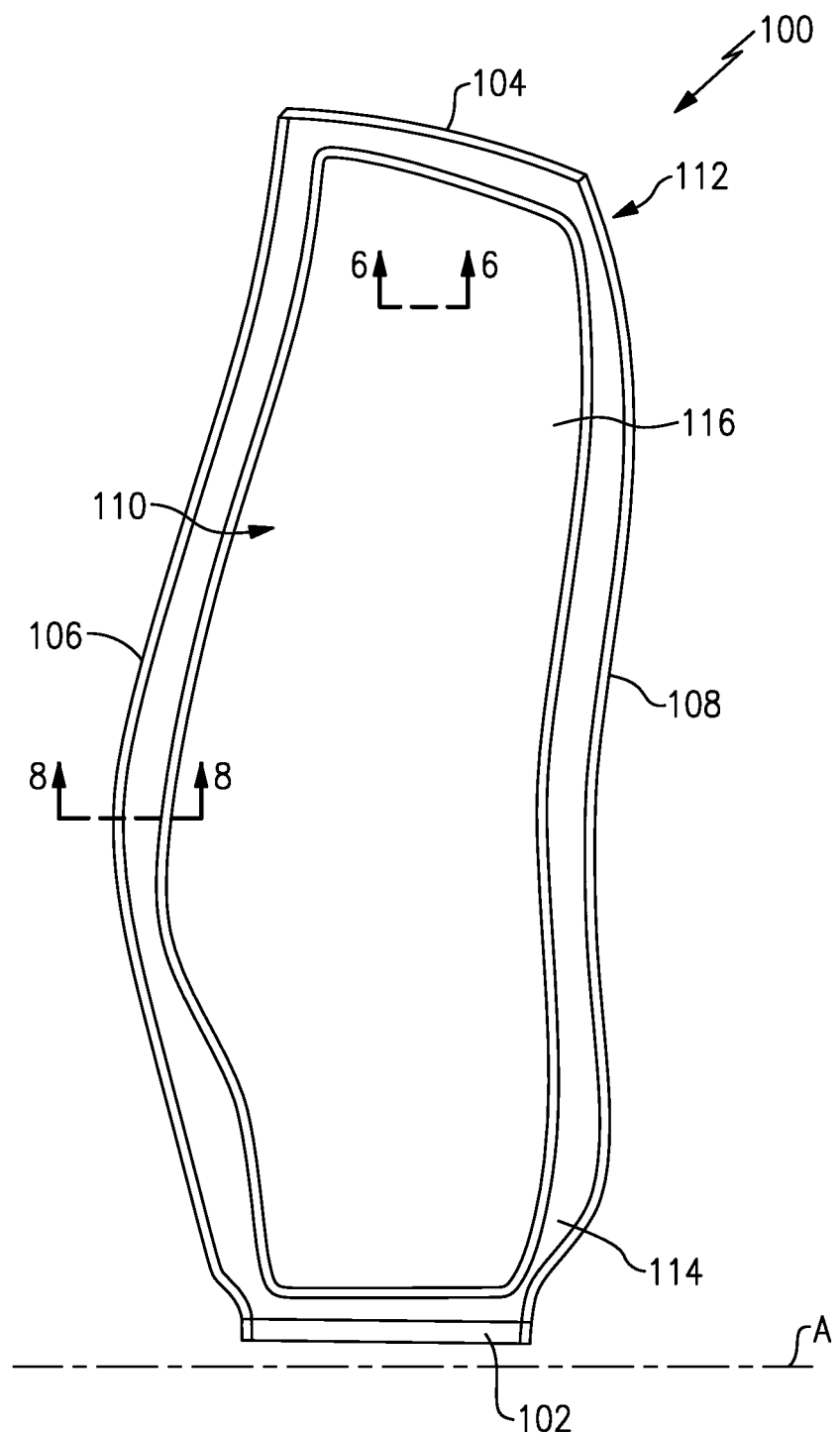
FIG. 2 illustrates an example fan blade.

FIG. 2 illustrates an example airfoil 100, such as a fan blade, for the fan section 22 of the gas turbine engine 20. In the illustrated non-limiting example, the airfoil 100 includes a base 102 or root at a radially inner end that is attachable to a hub and a tip 104 at a radially outer end adjacent the fan case 15. The airfoil 100 includes a leading edge 106 along an axially forward edge of the airfoil 100 and a trailing edge 108 along an axially downstream edge of the airfoil 100. In this disclosure axial, axially, radial, or radially is in relation to the engine axis A unless stated otherwise.

The airfoil 100 also includes a pressure side 110 on first circumferential side of the airfoil 100 and a suction side 112 on a second opposite circumferential side of the airfoil 100. The airfoil 100 includes a body portion 114 and a cover 116 that encloses a portion of the airfoil 100. In the illustrated example, the cover 116 is located on the pressure side 110 of the airfoil 100. However, the cover 116 could be located on the suction side 112 of the airfoil 100 instead of the pressure side 110.

Figure 3:
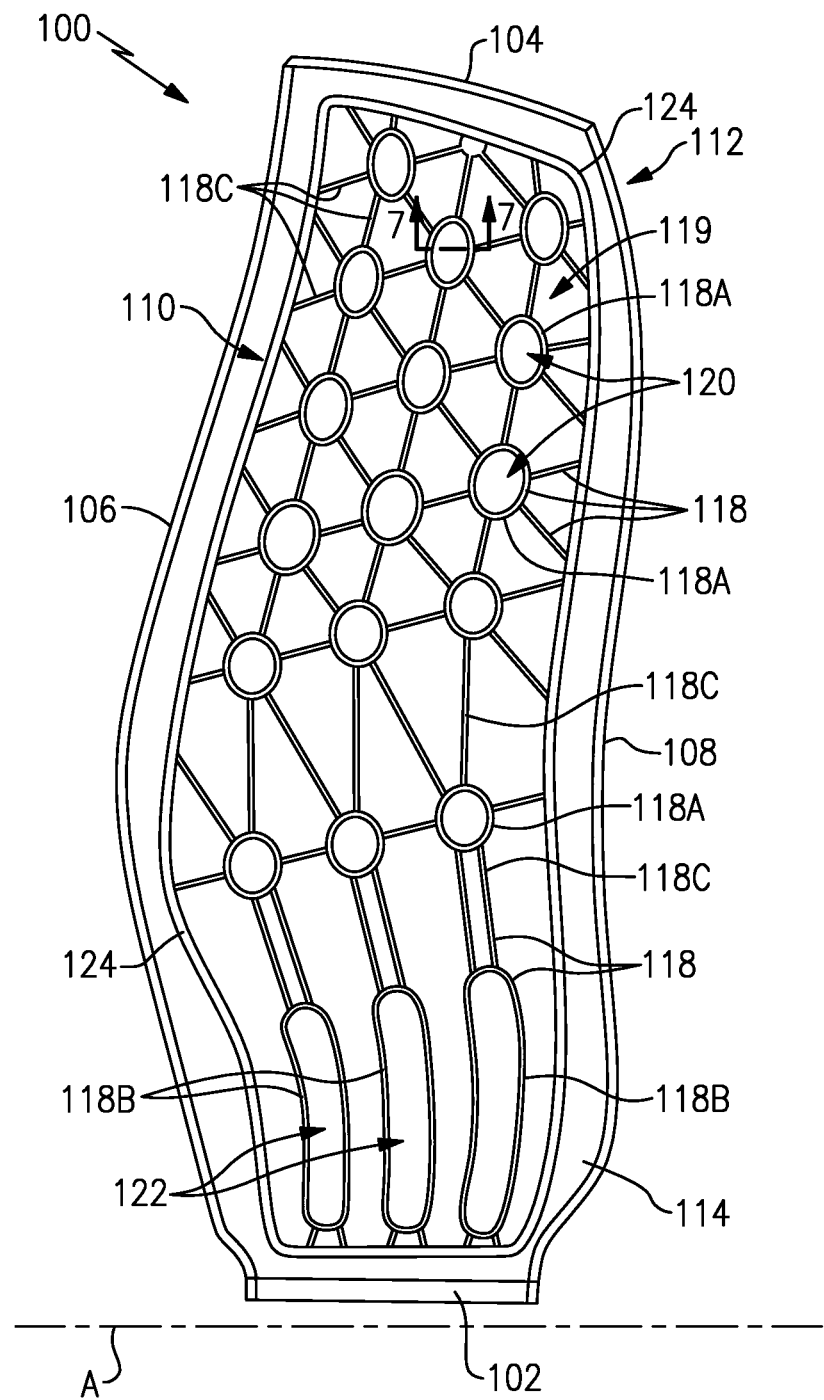
FIG. 3 illustrates a recessed area in the example fan blade of FIG. 2.

As shown in FIG. 3, the airfoil 100 includes a recessed area 119 on the pressure side 110. The recessed area 119 is divided into a plurality of geometric shapes by at least one the rib 118. In the illustrated example, the plurality of geometric shapes defined by the at least one rib 118 include multiple circular recesses 120 and multiple elongated recesses 122. The circular recesses 120 are at least partially defined by the body portion 114 and a circular rib 118A and the elongated recesses 122 are at least partially defined by the body portion 114 and elliptical ribs 118B.

Figure 4:
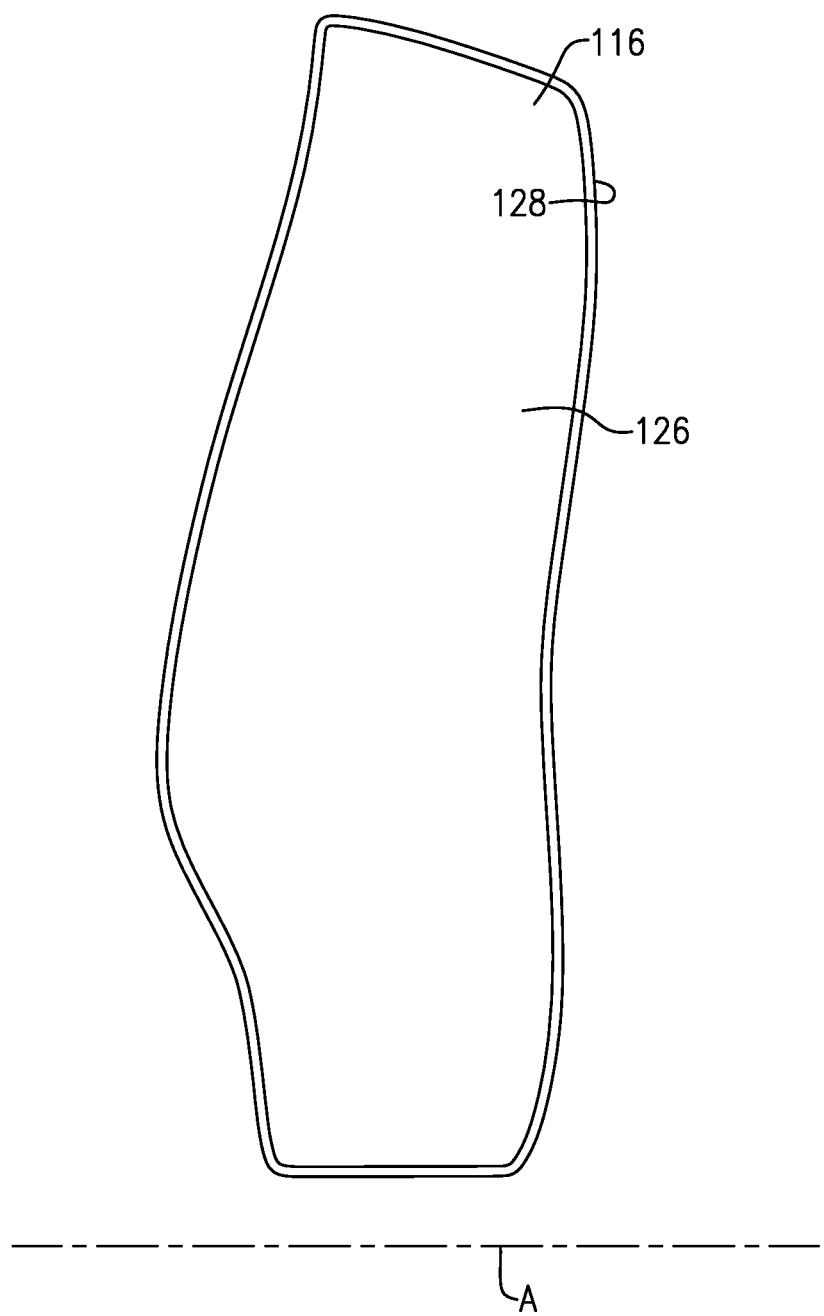
FIG. 4 illustrates an example cover for the example fan blade of FIG. 2.

The circular ribs 118A and the elliptical ribs 118B are interconnected by at least one linear rib 118C and the at least one linear ribs 118C intersects a perimeter of the recessed area 119. The perimeter of the recessed area 119 includes an indentation 124 for receiving the cover 116 (FIG. 4). A pressure side surface 126 of the cover 116 forms a majority of the pressure side 110 of the airfoil 100 with the body portion 114 surrounding the cover 116 and the recessed area 119.

Figure 5:
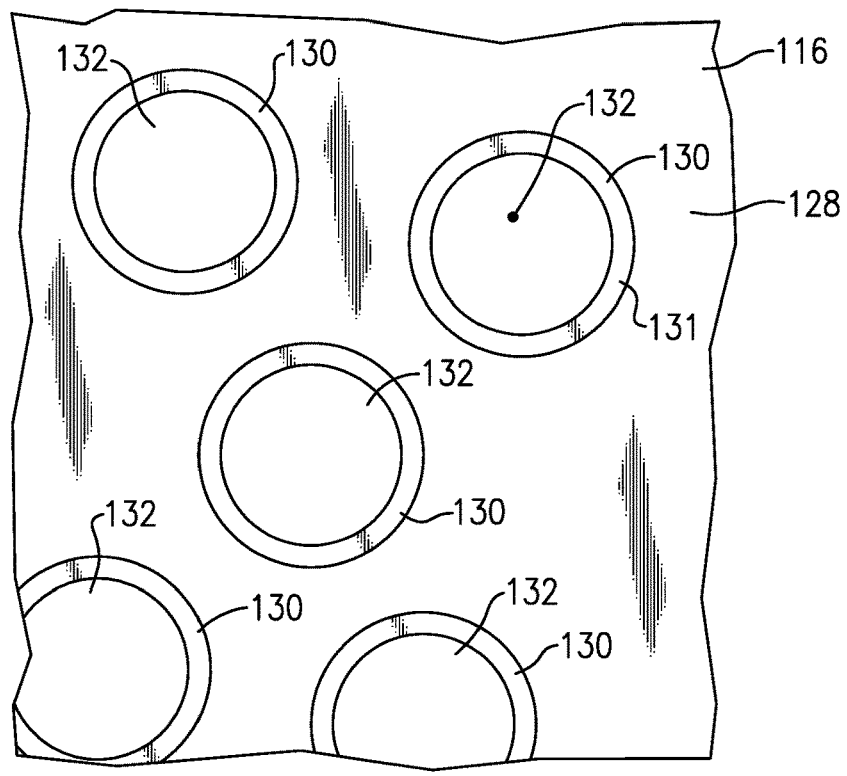
FIG. 5 illustrates a partial view of an interior surface of the example cover of FIG. 4.

FIG. 5 illustrates an inner side 128 of the cover 116 having a plurality of pedestals 130. In the illustrated non-limiting example, the plurality of pedestals 130 are ring shaped to correspond to the circular ribs 118A on the body portion 114. The pedestals 130 can also be elliptical to correspond to the shape of the elliptical ribs 118B or follow a perimeter of the cover 116 and correspond to the indentation 124 in the body portion 114. The pedestals 130 are positioned on an inner side 128 of the cover 116 and at least partially align with a corresponding one of the circular ribs 118A in the recessed area 119. The plurality of pedestals 130 can be formed through performing a machining process such as a mechanical or chemical engagement with the inner surface 128 of the cover 116.

Figure 6:
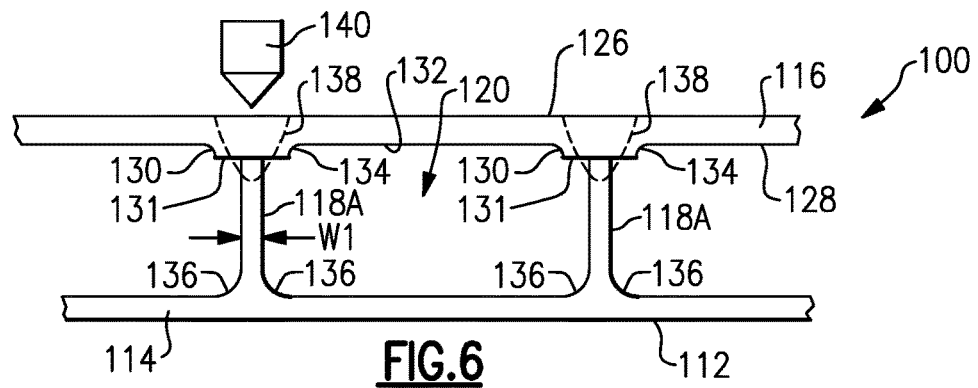
FIG. 6 illustrates a cross-sectional view of the fan blade of FIG. 2 taken along line 6-6 of FIG. 2 which is coincident with line 7-7 in FIG. 3.

As shown in FIG. 6, the pedestals 130 include a rib contact surface 131 with a fillet 134 on each side of the rib contact surface 131 and surround an inner recessed surface 132. In one example, the rib contact surface 131 is spaced from the inner recessed surface 132 by 0.025 inches (0.064 cm) and a thickness of the cover 116 at the rib contact surface is 0.115 inches (0.292 cm). A width of the contact surface 131 on the pedestal 130 is greater than a width of a distal end of the circular ribs 118A. In the illustrated example, the width of the rib contact surface 131 on the pedestals 130 is at least three (3) times the width of the distal end of the circular ribs 118A. The circular ribs 118A extend from the body portion 114 adjacent the suctions side 112 and include fillets 136 at an intersection of the rib 118A with the body portion 114.

The ribs 118A are attached to corresponding pedestals 130 by a welding process utilizing a welder 140. In the illustrated example, dash lines illustrate a profile of a weld 138 formed by the welder 140. As shown in FIG. 6, the weld 138 encompasses an interface between the distal end of the rib 118A and the rib contact surface 131. By having the weld 138 extend across the rib contact surface 131 at width greater than the width of the distal end of the circular rib 118A, stress concentrations in the weld 138 are eliminated or significantly reduced at the interface of the circular rib 118A and the pedestals 130. The elimination or reduction of stress concentrations improves the serviceable lifetime of the airfoil 100.

Figure 7:
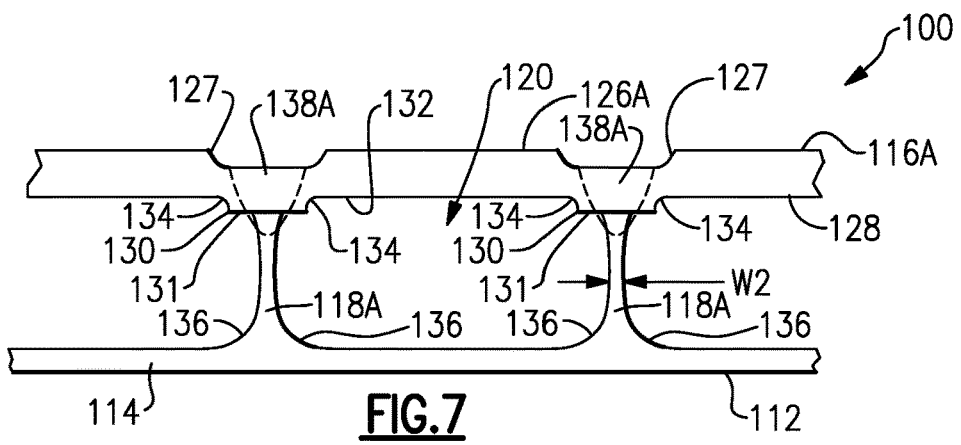
FIG. 7 illustrates a cross-sectional view of another example fan blade.

FIG. 7 illustrates another cross-sectional profile of the airfoil 100 with similar circular ribs 118A and a cover 116A. As shown in FIG. 6, the circular ribs 118A include a constant cross-sectional width W1 through a mid-portion of the circular ribs 118A. However, as shown in FIG. 7, circular ribs 118A include a reduced cross-sectional width W2 along a mid-portion of the circular rib 118A. The reduction in width of the circular ribs 118A reduces the overall weight of the body portion 114 of the airfoil 100 while maintaining the width W1 at the distal end of the circular ribs 118A.

The cover 116A also includes a pressure side surface 126A with a plurality of recessed portion 127 that correspond to the pedestals 130 on the inner side 128. A depth of the recessed portions 127 is selected to provide a desired thickness of the cover 116A adjacent the pedestals 130 to ensure proper weld penetration for the weld 138A.

Figure 8:
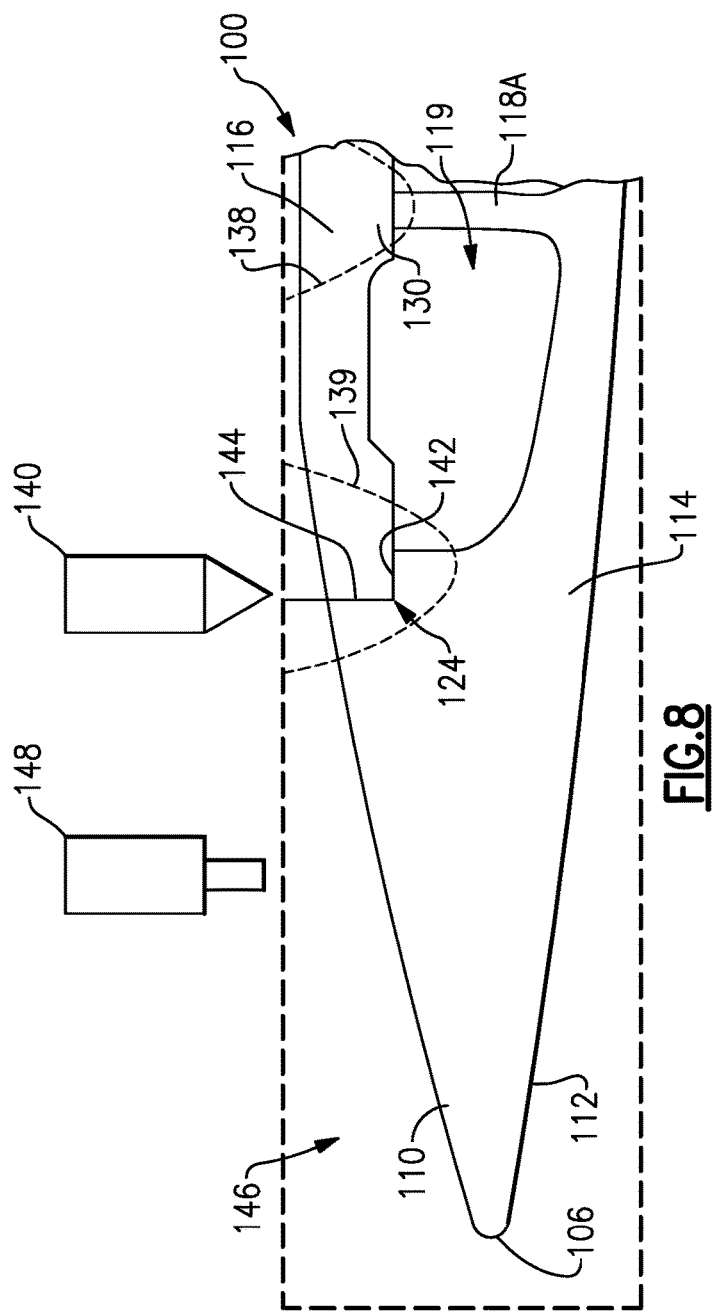
FIG. 8 illustrates an example partial profile of the fan blade of FIG. 2.

FIG. 8 illustrates a method of machining the airfoil 100. Before the airfoil 100 is machined into its final profile, the airfoil 100 is in the form of a block 146 of metal, such as titanium, at the leading edge 106, trailing edge 108 and tip 104, as illustrated with the dashed lines in FIG. 8. The block 146 includes the recessed area 119 that has been machined in the block 146 prior to machining the remainder of the airfoil 100 including the pressure side 110 and the suction side 112 that extend between the leading edge 106 and the trailing edge 108.

After the recessed area 119 has been machined, the cover 116 is positioned over the recessed area 119. The cover 116 is welded to the body portion 114 by the welder 140. In the illustrated example, the cover 116 engages the indentation 124. The indentation 124 includes a ledge 142 and peripheral wall 144. The cover 116 abuts both the ledge 142 and the peripheral wall 144. The welder 140 forms a weld 139 shown by the dashed line that encompasses both the ledge 142 and peripheral wall 144 of indentation 124. The weld 139 extends into the recessed area 119 to ensure complete fusion of ledge 142. Subsequent to a post-weld stress relief, a machining tool 148 removes the material shown between the dashed line of the block 146 and the final profile of the airfoil 100. As shown in FIG. 8, at least a portion of the welds 138, 139 and a portion of the cover 116 are removed by the machining tool 148.

The peripheral indentation 124, the circular ribs 118A, and the elliptical ribs 118B are the only portions of the body portion 114 that are welded to the cover 116. Linear ribs 118C interconnecting the circular ribs 118A and elliptical ribs 118B are not welded to the cover 116 because they are recessed in height to prevent contact with cover 116.

Because the indentation 124, circular ribs 118A, and elongated ribs 118B form a continuous loop, the welder 140 can eliminate the effects of stress concentrations that can form at the beginning and the end of a weld path. Additionally, other continuous looped/closed form patterns could be used such as squares or prismatic shapes. Furthermore, the strength of the weld can be controlled to eliminate damage or irregularities in the welds 138, 139 when the welder 140 initiates a weld. For example, the welder 140 may begin at an increased level of intensity to achieve a desired weld penetration into the cover 116 and the body portion 114. However, this initial increased level of intensity can cause defects in the weld 138, 139. Therefore, because the welds 138, 139 are formed in continuous loops, the welder 140 can pass over a starting portion of the weld 138, 139 and alleviate any defect that was formed by the initial increased level of intensity by the welder 140.

A similar defect can result at the end of a weld pattern. However, because the welder 140 overlaps the beginning of the weld 138, 139 with the endpoint of the weld 138, 139, any defect that occurs at the beginning or end of the weld 138, 139 is reduced by the overlapping weld path.

Figure 9:
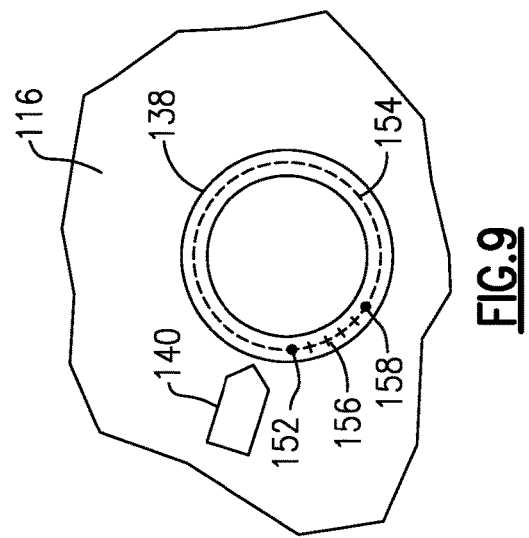
FIG. 9 illustrates an example weld path.

FIG. 9 illustrates an example weld path 154 for welding the cover 116 to the body portion 114. For the weld path 154, the welder 140 begins at start point 152 and continues in a counter-clockwise direction around the entire circumference of the weld path 154 forming the weld 138. The welder 140 completes a 360 degree loop and continues overlapping the prior weld path 154 and ends at point 158, which is at some point past the start point 152 and still on the weld path 154. The region of overlap 156 of the welder 140 along the weld path 154 is illustrated by the plus sign markings. Therefore, as discussed above, by separating the start and end points 152, 158 and forming one continuous loop with a defined region of overlap 156 wherein the welder 140 power is reduced in a controlled manner, there is a reduction in defects that would be associated with a traditional welding start point and end point.

Figure 10:
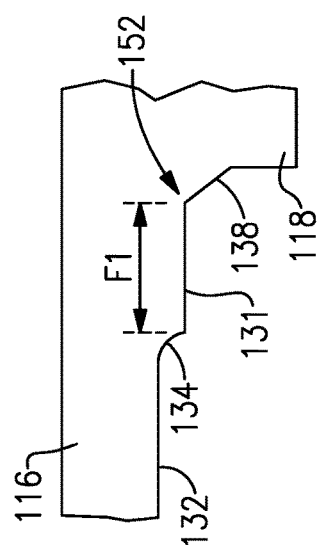
FIG. 10 illustrates an enlarged view of an interface between a rib and the cover.

FIG. 10 illustrates an enlarged partial view of the interface between the cover 116 and the ribs 118. One area of elevated stress concentration is the cover/pedestal fillet 134 which connects the rib contact surface 131 with the inner recessed surface 132. Another area of elevated stress is at a pedestal/weld interface 152 located at the intersection of the weld 138 and the rib contact surface 131. In the illustrated example, the fillet 134 is separated from the weld 138 by a distance F1 along the rib contact surface 131 of the pedestal 130. In this disclosure a ratio of the radius of the fillet 134 to the distance F1 can vary from 0.3 to 5.0 in one example and between 1.7 and 5.0 in another example. A ratio of fillet radius to distance F1 results in a stress at the pedestal/weld interface of between 6% and 60% when compared to a cover without a pedestal. This reduction in stress will allow the part to have a longer serviceable life or to withstand greater operating stresses.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An airfoil comprising:
   an airfoil body portion having a pressure side and a suction side;
   a recessed area in the airfoil body portion located on one of the pressure side or the suction side;
   at least one rib dividing the recessed area into at least one geometric shape;
   a cover enclosing the recessed area and including at least one pedestal engaging a distal end of the at least one rib and the at least one pedestal includes a rib contact surface having a width greater than a width of the distal end of the at least one rib; and
   a weld extending through the cover and a portion of the at least one rib, wherein the weld spans a width of the distal end of the at least one rib and the weld circumscribes the geometric shape and forms a continuous loop following the geometric shape.

2. The airfoil of claim 1, wherein the at least one geometric shape is closed form.

3. The airfoil of claim 1, wherein the at least one geometric shape includes at least one of an elliptical shape or a circular shape.

4. The airfoil of claim 1, further comprising an indentation defining a perimeter of the recessed area and a perimeter weld extending through the cover into a portion of the body portion defining the indentation, wherein the perimeter weld circumscribes the recessed area.

5. The airfoil of claim 4, wherein the perimeter weld includes an overlapping weld portion.

6. The airfoil of claim 4, wherein the indentation includes a perimeter ledge for engaging an inner surface of the cover and a perimeter wall for engaging an edge of the cover.

7. The airfoil of claim 1, wherein a ratio of a radius of a pedestal fillet to a width of the pedestal between the weld and the fillet is between 0.3 and 5.0.

8. The airfoil of claim 1, wherein the distal end of the at least one rib includes a width greater than a width of a mid-portion of the at least one rib.

9. The airfoil of claim 1, wherein the weld includes an overlapping weld portion.

10. An airfoil comprising:
    an airfoil body portion having a pressure side and a suction side;
    a recessed area in the airfoil body portion located on one of the pressure side or the suction side;
    at least one rib dividing the recessed area into at least one geometric shape;
    a cover enclosing the recessed area and including at least one pedestal engaging a distal end of the at least one rib; and
    a weld extending through the cover and a portion of the at least one rib, wherein the weld spans a width of the distal end of the att least one rib, the weld circumscribes the geometric shape and forms a continuous loop following the geometric shape, and the weld includes an overlapping weld portion.

11. A method of forming an airfoil comprising the steps of:
    forming a recessed area into an airfoil body portion, wherein the recessed area includes at least one rib dividing the recessed area into at least one geometric shape;
    locating a cover over the recessed area, wherein the cover includes at least one pedestal engaging a distal end of the at least one rib and the at least one pedestal includes a rib contact surface having a width greater than a width of the distal end of the at least one rib; and
    welding through the cover into a portion of the at least one rib to form a weld, wherein the weld spans a width of the distal end of the at least one rib and circumscribes the geometric shape and forms a continuous loop following the geometric shape.

12. The method of claim 11, wherein welding through the cover into a portion of the at least one rib to form a weld includes an overlapping weld portion.

13. The method of claim 11, further comprising forming an indentation in the airfoil body portion around a perimeter of the recessed area.

14. The method of claim 13, further comprising welding a perimeter weld through the cover into a portion of the airfoil body portion defining the indentation, wherein the perimeter weld circumscribes the indentation.

15. The method of claim 14, wherein the perimeter weld includes an overlapping weld portion.

16. The method of claim 13, wherein the indentation includes a perimeter ledge for engaging an inner surface of the cover and a perimeter wall for engaging an edge of the cover.

17. The method of claim 11, further comprising machining an exterior surface of the airfoil including a portion of the weld.

* * * * *